United States Patent
Louafi et al.

(10) Patent No.: US 12,108,315 B2
(45) Date of Patent: Oct. 1, 2024

(54) SYSTEMS AND METHODS FOR DETECTION OF ABNORMAL UE BEHAVIOR

(71) Applicant: Telefonaktiebolaget LM Ericsson (publ), Stockholm (SE)

(72) Inventors: Habib Louafi, Montreal (CA); Makan Pourzandi, Montreal (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 686 days.

(21) Appl. No.: 17/274,272

(22) PCT Filed: Sep. 7, 2018

(86) PCT No.: PCT/IB2018/056848
§ 371 (c)(1),
(2) Date: Mar. 8, 2021

(87) PCT Pub. No.: WO2020/049346
PCT Pub. Date: Mar. 12, 2020

(65) Prior Publication Data
US 2021/0321259 A1    Oct. 14, 2021

(51) Int. Cl.
*H04W 4/70* (2018.01)
*G06F 18/214* (2023.01)
(Continued)

(52) U.S. Cl.
CPC .......... *H04W 4/70* (2018.02); *G06F 18/2148* (2023.01); *G06F 18/23213* (2023.01);
(Continued)

(58) Field of Classification Search
None
See application file for complete search history.

(56) References Cited

U.S. PATENT DOCUMENTS

| 2016/0028751 A1* | 1/2016 | Cruz Mota | ......... H04L 63/1408 726/23 |
| 2018/0109975 A1* | 4/2018 | Kalliola | ................ H04W 24/04 |

OTHER PUBLICATIONS

Author Unknown, "Technical Specification Group Services and System Aspects; Study on Communication for Automation in Vertical Domains (Release 16)," Technical Report 22.804, Version 16.0.0, 3GPP Organizational Partners, Jun. 2018, 189 pages.
(Continued)

*Primary Examiner* — Adolf Dsouza
(74) *Attorney, Agent, or Firm* — Sage Patent Group

(57) ABSTRACT

Systems and methods for detecting abnormal User Equipment (UE) behavior in a cellular communications system are disclosed. In some embodiments, a method of operation of a first Network Anomaly Detection (NAD) function associated with a first Radio Access Network (RAN) in a cellular communications system comprises, during a period of time, obtaining information regarding UEs served by the first RAN, detecting that a particular UE has moved from the first RAN to a second RAN, and sending at least some of the information regarding the particular UE to a second NAD function associated with the second RAN. The method further comprises producing a trained partial model of UE behavior for the first RAN, sending corresponding information to the second NAD function, receiving information regarding a trained partial model of UE behavior for the second RAN, generating a trained global model, and performing a prediction of abnormal UE behavior based thereon.

19 Claims, 8 Drawing Sheets

(51) Int. Cl.
G06F 18/23213 (2023.01)
G06N 20/00 (2019.01)
H04L 9/40 (2022.01)
H04W 12/121 (2021.01)
H04W 24/06 (2009.01)
H04W 24/08 (2009.01)

(52) U.S. Cl.
CPC ......... *G06N 20/00* (2019.01); *H04L 63/1425* (2013.01); *H04W 12/121* (2021.01); *H04W 24/06* (2013.01); *H04W 24/08* (2013.01)

(56) References Cited

OTHER PUBLICATIONS

Author Unknown, "Technical Specification Group Radio Access Network; NG-RAN; Architecture description (Release 15)," Technical Specification 38.401, Version 15.2.0, 3GPP Organizational Partners, Jun. 2018, 39 pages.

Author Unknown, "What is a TIMSI?" GSM Security, retrieved Jul. 11, 2018, 1 pages, URL: http://www.gsm-security.net/faq/timsi-temporary-imsi-gsm.shtml.

Author Unknown, "MSISDN—definition and examples," Telecom Blog, retrieved Jun. 11, 2018, 2 pages, URL: http://www.msisdn.org/.

Feldman, Dan, et al., "Bi-criteria Linear-time Approximations for Generalized k-Mean/Median/Center," Symposium on Computational Geometry (SCG'07), Jun. 6-8, 2007, Gyeongju, South Korea, 8 pages.

Norrman, Karl, et al., "Protecting IMSI and User Privacy in 5G Networks," International Conference on Mobile Multimedia Communications, Jun. 2016, 8 pages.

Oliva, Gabriele, et al., "Distributed k-means algorithm," Submitted to IEEE Transactions on Mobile Computing, 2013, 16 pages.

Trevino, Andrea, "Introduction to K-means Clustering," Learn Data Science, Machine Learning, ORACLE + DataScience.com, Dec. 6, 2016, 14 pages.

International Search Report and Written Opinion for International Patent Application No. PCT/IB2018/056848, mailed May 9, 2019, 15 pages.

* cited by examiner

SYSTEMS AND METHODS FOR DETECTION OF ABNORMAL UE BEHAVIOR

This application is a 35 U.S.C. § 371 national phase filing of International Application No. PCT/IB2018/056848, filed Sep. 7, 2018, the disclosure of which is incorporated herein by reference in its entirety.

TECHNICAL FIELD

The present disclosure relates to detection of abnormal User Equipment (UE) behavior in a cellular communication system.

BACKGROUND

A virtualized, or virtual, Radio Access Network (vRAN) architecture for cellular communications networks such as, e.g., Third Generation Partnership Project (3GPP) cellular communications networks, has been introduced, e.g., as a solution to process radio packets at the network edge. Traditionally, radio packets are processed at the base station level (e.g., at the enhanced or evolved Node B (eNB) in 3GPP Long Term Evolution (LTE)). This architecture is not scalable, as any update to the processing software should be deployed in each base station.

In the vRAN architecture, the processing stack of the radio packet is split into two parts. The first part is the hardware (e.g., transmitter and receiver hardware, antennas, etc.) that remains at the base station level. This first part is sometimes referred to as a Remote Radio Head (RRH). The second part, which is sometimes referred to as the baseband unit, is relocated from the base station to a virtualized environment, which is referred to as the vRAN. The virtualized environment is implemented by software executing on one or more servers, e.g., in a datacenter-like facility. Depending on the vRAN design and implementation, the physical network layer (i.e., L1) is implemented in the RRH, while the remaining layers (e.g., L2, L3, etc.) are implemented in the baseband unit implemented in the vRAN. However, this implementation based on network layers in not clearly segregated, as some network functions of a given layer may be implemented in the RRH while other network functions of the same layer may be implemented in the baseband unit. Without loss of generality, it is assumed that the physical layer is implemented at the RRH, while the other layers are in the baseband unit virtualized in the vRAN.

As a result of the vRAN architecture, several baseband units associated to different base stations can be centralized in the same location, i.e., in the same vRAN. This design has two main advantages. The first is scalability. That is, when a new base station is added to the network, a new baseband unit can be instantiated in the vRAN and associated to the RRH of the newly created base station. Also, any software maintenance, such as security patching, can be done in a single place (i.e., in the vRAN), instead of pushing the updates to all the eNBs, which are obviously spread out in different physical locations. The second advantage is virtualization, i.e., computing resources are instantiated on the fly (e.g., when a new base station is connected) and released when no longer needed (e.g., when a base station is disconnected).

In this regard, FIG. 1 illustrates one example of a cellular communications system 100 including vRANs 102-1 and 102-2 (generally referred to herein collectively as vRANs 102 and individually as vRAN 102). While only two vRANs 102 are illustrated, the cellular communications system 100 can include more than two vRANs 102. The vRAN 102-1 includes a Baseband Unit (BBU) pool 104 implemented in a virtualized environment, where the BBU pool 104 includes a number of (virtualized) BBUs 106-1 through 106-N that, together with respective RRHs 108-1 through 108-N, form a number of base stations. In a similar manner, the vRAN 102-2 includes a BBU pool 110 implemented in a virtualized environment, where the BBU pool 110 includes a number of (virtualized) BBUs 112-1 through 112-M that, together with respective RRHs 114-1 through 114-M, form a number of base stations. Optionally, in some embodiments, one or more layer 1 (i.e., PHY layer) functions 116-1 and 116-2 of the base stations are implemented in the vRANs 102-1 and 102-2, respectively. The vRANs 102-1 and 102-2 are connected to a core network(s) 118.

Note that while the "vRAN," "BBU," and "RRH" terminology is used herein, in some embodiments, the BBUs are New Radio (NR) base station (gNB) Central Units (CUs) as defined in 3GPP Technical Specification (TS) 38.401 and the RRHs are gNB Distributed Units (DUs) as defined in 3GPP TS 38.401. Also, the term "vRAN" is to refer to any architecture in which one of more functions of a base station are implemented in a virtualized environment.

One problem with cellular communications systems is that mobile and Internet of Things (IoT) devices connected to base stations can be exploited to perform malicious activities on the network. In general, attackers exploit existing vulnerabilities, which can be patched to mitigate any possible threat. When it comes to unknown vulnerabilities, the attacks may go undetected. With respect to the vRAN architecture, it is not yet known how to best address such attacks in cellular communications systems that utilize the vRAN architecture.

SUMMARY

Systems and methods for detecting abnormal User Equipment (UE) behavior in a cellular communications system are disclosed. In some embodiments, a method of operation of a first Network Anomaly Detection (NAD) function associated with a first Radio Access Network (RAN) for predicting normal and/or abnormal UE behavior in a cellular communications system comprises, during a period of time from a time $T_0$ to a time $T_0+T$: obtaining information regarding a plurality of UEs served by the first RAN, detecting that a particular UE has moved from the first RAN to a second RAN, and sending at least some of the information regarding the particular UE to a second NAD function associated with the second RAN. The method further comprises producing a trained partial model of UE behavior for the first RAN based on at least some of the information regarding the plurality of UEs and sending, to the second NAD function associated with the second RAN, the trained partial model of UE behavior for the first RAN or information that is representative of the trained partial model of UE behavior for the first RAN. The method further comprises receiving, from the second NAD function associated with the second RAN, a trained partial model of UE behavior for the second RAN or information that is representative of the trained partial model of UE behavior for the second RAN. The method further comprises generating a trained global model of UE behavior based on: (a) the trained partial model of UE behavior for the first RAN or information that is representative of the trained partial model of UE behavior for the first RAN and (b) the trained partial model of UE behavior for the second RAN or information that is representative of the trained partial model of UE behavior for the second RAN, and performing a prediction of abnormal UE behavior of a particular UE served by the first RAN based on the trained global model of UE behavior. In some embodiments, the first RAN is a first virtualized RAN (vRAN), and the second RAN is a second vRAN.

In some embodiments, producing the trained partial model of UE behavior for the first RAN comprises preprocessing at least some of the information regarding the plurality of UEs to obtain, for each of at least some of the plurality of UEs, one or more values for one or more respective parameters that are indicative of UE behavior of the UE during the period of time, and generating the trained partial model of UE behavior for the first RAN based on the one or more values for the one or more respective parameters for each of the at least some of the plurality of UEs. In some embodiments, the one or more parameters that are indicative of UE behavior comprise a number of connections made by the UE during the period of time, an average bandwidth used by the UE during the period of time, frequency and/or length of the connections made by the UE during the time period, and/or signaling anomalies for the UE.

In some embodiments, generating the trained partial model of UE behavior for the first RAN comprises generating the trained partial model of UE behavior for the first RAN based on the one or more values for the one or more respective parameters for each of the at least some of the plurality of UEs using K-means clustering, and generating the trained global model of UE behavior comprises generating the trained global model of UE behavior based on: (a) the trained partial model of UE behavior for the first RAN or information that is representative of the trained partial model of UE behavior for the first RAN and (b) the trained partial model of UE behavior for the second RAN or information that is representative of the trained partial model of UE behavior for the second RAN, using K-means clustering.

In some embodiments, the trained partial model of UE behavior for the first RAN and the trained global model of UE behavior are machine learning models.

In some embodiments, sending, to the second NAD function associated with the second RAN, the trained partial model of UE behavior for the first RAN or information that is representative of the trained partial model of UE behavior for the first RAN comprises sending, to the second NAD function associated with the second RAN, a coreset that is representative of the trained partial model of UE behavior for the first RAN. In some embodiments, the method further comprises generating the coreset from the trained partial model. In some embodiments, the trained partial model is a K-means clustering model, and generating the coreset from the trained partial model comprises generating the coreset from the trained partial model using a variation of bi-criteria K-means clustering approximation that starts with the centroids of the trained partial model and their closest points.

In some embodiments, the method further comprises, during the period of time from the time $T_0$ to the time $T_0+T$, obtaining a mapping of a temporary identifier of the particular UE used in the vRAN to a global identifier of the particular UE. In some embodiments, sending the at least some of the information regarding the particular UE to the second NAD function associated with the second RAN comprises sending the at least some of the information regarding the particular UE to the second NAD function associated with the second RAN together with the global identifier of the particular UE.

In some embodiments, the temporary identifier of the particular UE is a Temporary International Mobile Subscriber Identity (T-IMSI) assigned to the UE in the first RAN, and the trained global identifier of the particular UE is an International Mobile Subscriber Identity (IMSI) of the UE.

In some embodiments, the first NAD function is implemented in the first RAN. In some embodiments, obtaining the mapping of the temporary identifier of the particular UE used in the first RAN to the global identifier of the particular UE comprises obtaining the mapping from a mapping function implemented in a core network associated with the first RAN.

In some embodiments, the first NAD function is implemented in a core network associated with the first RAN. In some embodiments, obtaining the mapping of the temporary identifier of the particular UE used in the first RAN to the global identifier of the particular UE comprises obtaining the mapping from a core network function in the core network associated with the first RAN.

In some embodiments, the first NAD function is implemented in a distributed manner such that the first NAD function comprises one or more components implemented in the first RAN and one or more components implemented in a core network associated with the first RAN. In some embodiments, obtaining the information regarding the plurality of UEs served by the first RAN comprises obtaining, by a component of the first NAD function implemented in the first RAN, the information regarding the plurality of UEs served by the first RAN, and the method further comprises providing the information from the component of the first NAD function implemented in the first RAN to a component of the first NAD function implemented in the core network associated with the first RAN and obtaining the mapping of the temporary identifier of the particular UE used in the first RAN to the global identifier of the particular UE comprises obtaining, by the component of the first NAD function implemented in the core network associated with the first RAN, the mapping from a network function or core network entity in the core network associated with the first RAN.

In some other embodiments, a method of operation of a first NAD function associated with a first RAN for predicting normal and/or abnormal UE behavior in a cellular communications system comprises, during a period of time from a time $T_0$ to a time $T_0+T$: obtaining information regarding a plurality of UEs served by the first RAN; receiving, from a second NAD function associated with a second RAN, information regarding a particular UE that moved from the second RAN to the first RAN during the period of time; and correlating the information regarding the particular UE received from the second NAD function associated with the second RAN with information regarding the particular UE obtained while the particular UE was being served by the first RAN during the period of time. The method further comprises producing a trained partial model of UE behavior for the first RAN based on at least some of the information regarding the plurality of UEs and the information regarding the particular UE received from the second NAD function associated with the second RAN, and sending, to the second NAD function associated with the second RAN, the trained partial model of UE behavior for the first RAN or information that is representative of the trained partial model of UE behavior for the first RAN. The method further comprises receiving, from the second NAD function associated with the second RAN, a trained partial model of UE behavior for the second RAN or information that is representative of the trained partial model of UE behavior for the second RAN, and generating a trained global model of UE behavior based on: (a) the trained partial model of UE behavior for the first RAN or information that is representative of the trained partial model of UE behavior for the first RAN and (b) the trained partial model of UE behavior for the second RAN or information that is representative of the trained partial model of UE behavior for the second RAN. The method further comprises performing a prediction of abnormal UE behavior of a particular UE served by the first RAN based on the trained global model of UE behavior.

Embodiments of a first NAD function associated with a first RAN for predicting normal and/or abnormal UE behavior in a cellular communications system are also disclosed. In some embodiments, a first NAD function associated with a first RAN for predicting normal and/or abnormal UE behavior in a cellular communications system is adapted to, during a period of time from a time $T_0$ to a time $T_0+T$: obtain information regarding a plurality of UEs served by the first RAN, detect that a particular UE has moved from the first RAN to a second RAN, and send at least some of the information regarding the particular UE to a second NAD function associated with the second RAN. The first NAD function is further adapted to produce a trained partial model of UE behavior for the first RAN based on at least some of the information regarding the plurality of UEs, and send, to the second NAD function associated with the second RAN, the trained partial model of UE behavior for the first RAN or information that is representative of the trained partial model of UE behavior for the first RAN. The first NAD function is further adapted to receive, from the second NAD function associated with the second RAN, a trained partial model of UE behavior for the second RAN or information that is representative of the trained partial model of UE behavior for the second RAN, and generate a trained global model of UE behavior based on: (a) the trained partial model of UE behavior for the first RAN or information that is representative of the trained partial model of UE behavior for the first RAN and (b) the trained partial model of UE behavior for the second RAN or information that is representative of the trained partial model of UE behavior for the second RAN. The first NAD function is further adapted to perform a prediction of abnormal UE behavior of a particular UE served by the first RAN based on the trained global model of UE behavior.

In some embodiments, a first NAD function associated with a first RAN for predicting normal and/or abnormal UE behavior in a cellular communications system is adapted to, during a period of time from a time $T_0$ to a time $T_0+T$: obtain information regarding a plurality of UEs served by the first RAN; receive, from a second NAD function associated with a second RAN, information regarding a particular UE that moved from the second RAN to the first RAN during the period of time; and correlate the information regarding the particular UE received from the second NAD function associated with the second RAN with information regarding the particular UE obtained while the particular UE was being served by the first RAN during the period of time. The first NAD function is further adapted to produce a trained partial model of UE behavior for the first RAN based on at least some of the information regarding the plurality of UEs and the information regarding the particular UE received from the second NAD function associated with the second RAN, and send, to the second NAD function associated with the second RAN, the trained partial model of UE behavior for the first RAN or information that is representative of the trained partial model of UE behavior for the first RAN. The first NAD function is further adapted to receive, from the second NAD function associated with the second RAN, a trained partial model of UE behavior for the second RAN or information that is representative of the trained partial model of UE behavior for the second RAN, and generate a trained global model of UE behavior based on: (a) the trained partial model of UE behavior for the first RAN or information that is representative of the trained partial model of UE behavior for the first RAN and (b) the trained partial model of UE behavior for the second RAN or information that is representative of the trained partial model of UE behavior for the second RAN. The first NAD function is further adapted to perform a prediction of abnormal UE behavior of a particular UE served by the first RAN based on the trained global model of UE behavior.

Embodiments of a system implementing a NAD function are also disclosed. In some embodiments, a system comprises one or more processing nodes each comprising one or more processors, memory, and a network interface, wherein the memory of the one or more processing node stores instructions executable by the respective one or more processors whereby the system is operable to implement a first NAD function associated with a first RAN for predicting normal and/or abnormal UE behavior in a cellular communications system, the first NAD function being adapted to, during a period of time from a time $T_0$ to a time $T_0+T$: obtain information regarding a plurality of UEs served by the first RAN, detect that a particular UE has moved from the first RAN to a second RAN, and send at least some of the information regarding the particular UE to a second NAD function associated with the second RAN. The first NAD function is further adapted to produce a trained partial model of UE behavior for the first RAN based on at least some of the information regarding the plurality of UEs, and send, to the second NAD function associated with the second RAN, the trained partial model of UE behavior for the first RAN or information that is representative of the trained partial model of UE behavior for the first RAN. The first NAD function is further adapted to receive, from the second NAD function associated with the second RAN, a trained partial model of UE behavior for the second RAN or information that is representative of the trained partial model of UE behavior for the second RAN, and generate a trained global model of UE behavior based on: (a) the trained partial model of UE behavior for the first RAN or information that is representative of the trained partial model of UE behavior for the first RAN and (b) the trained partial model of UE behavior for the second RAN or information that is representative of the trained partial model of UE behavior for the second RAN. The first NAD function is further adapted to perform a prediction of abnormal UE behavior of a particular UE served by the first RAN based on the trained global model of UE behavior.

In some embodiments, a system comprises one or more processing nodes each comprising one or more processors, memory, and a network interface, wherein the memory of the one or more processing node stores instructions executable by the respective one or more processors whereby the system is operable to implement a first NAD function associated with a first RAN for predicting normal and/or abnormal UE behavior in a cellular communications system, the first NAD function being adapted to, during a period of time from a time $T_0$ to a time $T_0+T$: obtain information regarding a plurality of UEs served by the first RAN, detect that a particular UE has moved from the first RAN to a second RAN, and send at least some of the information regarding the particular UE to a second NAD function associated with the second RAN. The first NAD function is further adapted to produce a trained partial model of UE behavior for the first RAN based on at least some of the information regarding the plurality of UEs, and send, to the second NAD function associated with the second RAN, the trained partial model of UE behavior for the first RAN or information that is representative of the trained partial model of UE behavior for the first RAN. The first NAD function is further adapted to receive, from the second NAD function associated with the second RAN, a trained partial model of UE behavior for the second RAN or information that is representative of the trained partial model of UE behavior for the second RAN, and generate a trained global model of UE behavior based on: (a) the trained partial model of UE behavior for the first RAN or information that is representative of the trained partial model of UE behavior for the first RAN and (b) the trained partial model of UE behavior for the second RAN or information that is representative of the trained partial model of UE behavior for the second RAN. The first NAD function is further adapted to perform a prediction of abnormal UE behavior of a particular UE served by the first RAN based on the trained global model of UE behavior.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
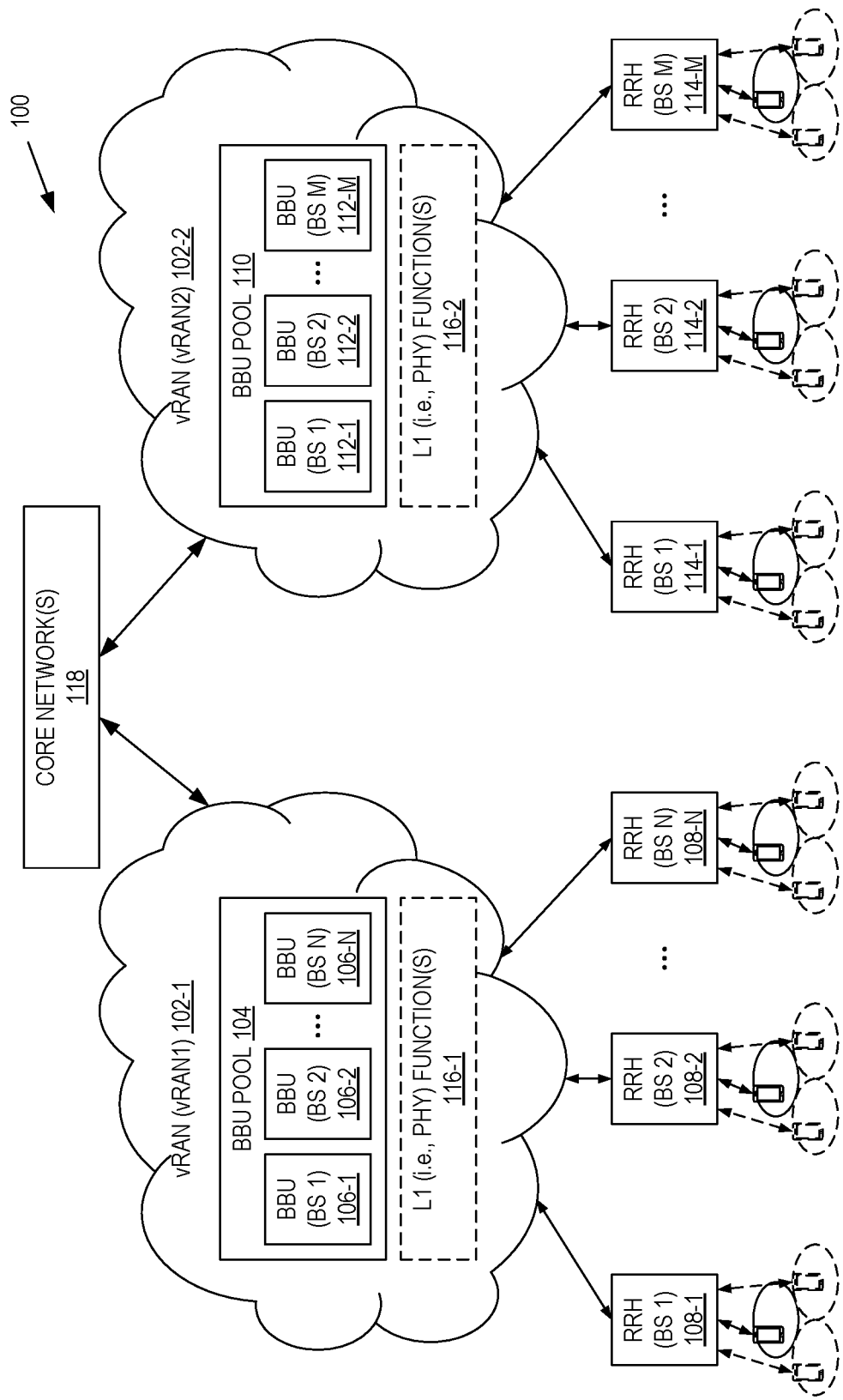
FIG. 1 illustrates one example of a cellular communications system including virtualized Radio Access Networks (vRANs)

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Systems and methods are disclosed herein for detecting abnormal User Equipment (UE) behavior in a cellular communications system, particularly one that uses a virtualized Radio Access Network (vRAN) architecture. As used herein, a "vRAN" is term that refers to functions of a Radio Access Network (RAN) and, in particular to functions of a radio base station, that are virtualized (e.g., running as one or more virtual components). Typically, the vRAN implements layers 2 and higher of a radio base station, whereas most if not all of layer 1 (i.e., the physical layer) of the radio base station is implemented in a physical radio component(s) referred to herein as a Remote Radio Head (RRH).

In general, connected wireless devices, which are referred to herein as UEs such as mobile devices and Internet of Things (IoT) devices, are profiled in order to train a machine leaning model of normal UE behavior. This machine learning model is used to detect abnormal UE behavior (e.g., detect a malicious UE). In some embodiments, there are two or more vRANs (potentially many vRANs) deployed apart from each other, and a collaborative detection system is used. In one preferred embodiment, a collaborative K-Means anomaly detection system is provided, where this collaborative K-Means anomaly detection system learns and predicts normal/abnormal UE behavior.

As described below, the proposed system includes a Network Anomaly Detection (NAD) function in each vRAN. Each NAD function monitors the set of UE connected to the respective vRAN in which the NAD function is deployed. Furthermore, the NAD functions collaborate with each other by exchanging partial machine learning models for their local UEs. Each NAD function aggregates its own partial model with those received from the other NAD functions to provide a global model of UE behavior that is then used to detect abnormal UE behavior.

Embodiments are also disclosed for collecting information for a UE in regard to its mobility in the cellular communications system. The challenge is that when the UE moves from one vRAN to another vRAN, the UE's behavior should be known in a unique way in both of the vRANs in order to provide a coherent model of the UE's behavior. Another challenge is to adapt the approach to handle the manipulation of temporary identities in the vRANs. The Third Generation Partnership Project (3GPP) standard requires the usage of temporary identities (i.e., Temporary International Mobile Subscriber Identities (T-IMSIs)) for the UEs in the RAN, embodiments are disclosed herein that enable tracking of a UE's behavior when moving from one vRAN to another vRAN even though the UE may have different temporary identities in different vRANs.

While not being limited by or to any particular advantage, embodiments of the present disclosure provide a number of advantages. For example, the following advantages or benefits are provided:

Detection of malicious mobile and IoT UEs at the vRAN. This solution detects malicious UEs much closer to the end UE, e.g., mobile phones. This approach compared to existing solutions deployed at the core network or at the network edge (cloudlet) would allow a more efficient detection of malicious mobile users. This approach distributes the detection load among different vRANs and therefore avoids the need for moving around huge quantity of logs and information from the vRANs to the core network or cloudlets to be processed and used for training of detection models.

Usage of a collaborative machine learning approach (e.g., a collaborative K-means approach) to learn UE behavior helps to detect attacks coming from unknown vulnerabilities.

Making different vRANs collaborate with each other to learn and make a global view of the behavior of all UEs that are connected to the vRANs' network. Each vRAN has a global view of all the UEs in the system.

Tracking and correlating UE information across mobility events such as movement from one vRAN to another vRAN.

Figure 2:
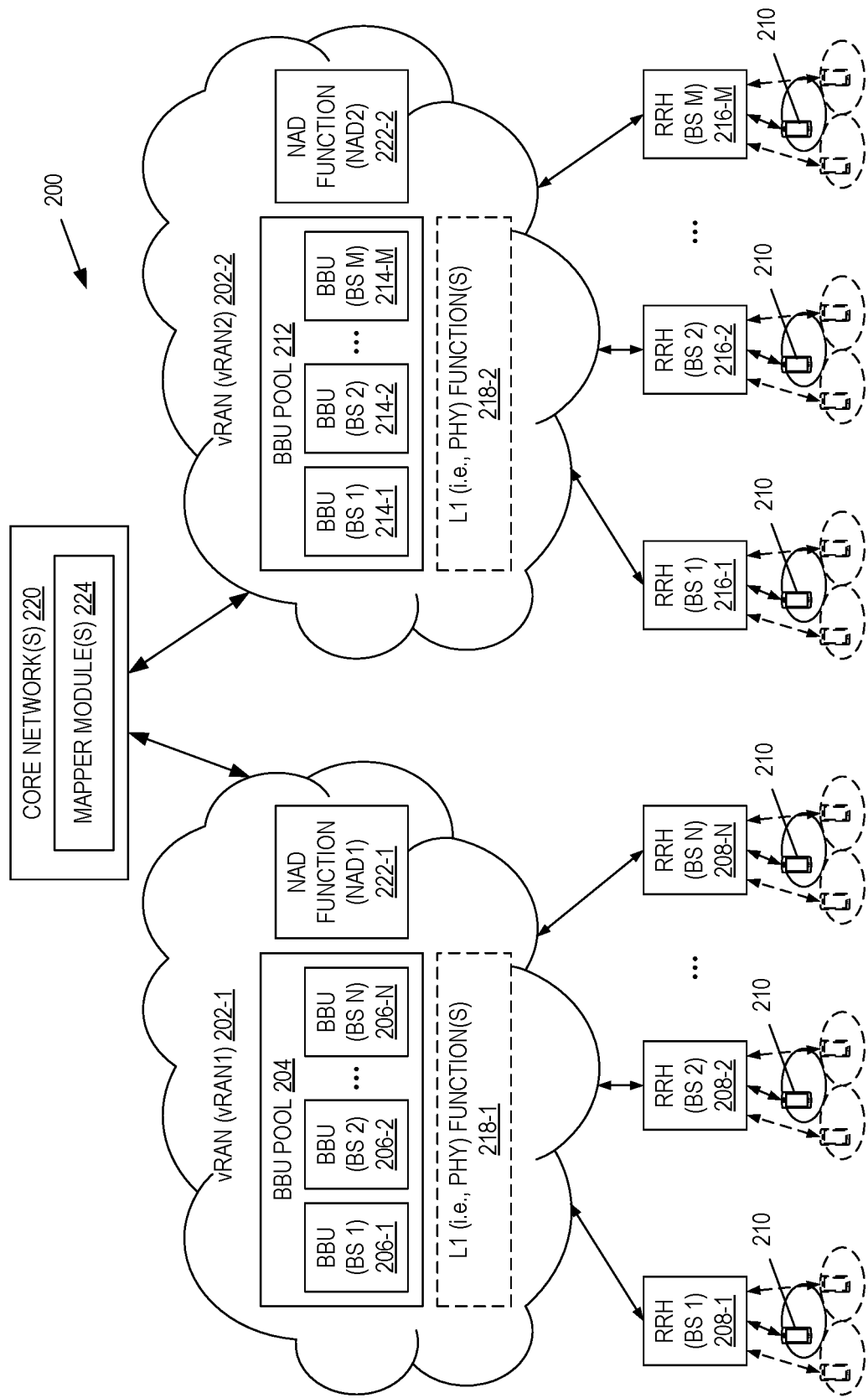
FIG. 2 illustrates one example of a cellular communications system including vRANs in which abnormal User Equipment (UE) behavior is detected in accordance with some embodiments of the present disclosure.

FIG. 2 illustrates one example of a cellular communications system 200 including vRANs 202-1 and 202-2 (generally referred to herein collectively as vRANs 202 and individually as vRAN 202) in which abnormal UE behavior is detected in accordance with some embodiments of the present disclosure. While only two vRANs 202 are illustrated, the cellular communications system 200 can include more than two vRANs 202. The vRAN 202-1 includes a Baseband Unit (BBU) pool 204 implemented in a virtualized environment, where the BBU pool 204 includes a number of (virtualized) BBUs 206-1 through 206-N that, together with respective RRHs 208-1 through 208-N, form a number of base stations (e.g., Fifth Generation (5G) New Radio (NR) base stations (gNBs) or Long Term Evolution (LTE) enhanced or evolved Node Bs (eNBs)) serving UEs 210 in respective cells of the cellular communications system 200. In a similar manner, the vRAN 202-2 includes a BBU pool 212 implemented in a virtualized environment, where the BBU pool 212 includes a number of (virtualized) BBUs 214-1 through 214-M that, together with respective RRHs 216-1 through 216-M, form a number of base stations (e.g., 5G gNBs or LTE eNBs) serving UEs 210 in respective cells of the cellular communications system 200. Optionally, in some embodiments, one or more layer 1 (i.e., PHY layer) functions 218-1 and 218-2 of the base stations are implemented in the vRANs 202-1 and 202-2, respectively. The vRANs 202-1 and 202-2 are connected to a core network(s) 220 (e.g., a 5G Core (5GC) or an Evolved Packet Core (EPC)).

In order to enable detection of abnormal UE behavior, the vRANs 202-1 and 202-2 include NAD functions 222-1 and 222-2, respectively (generally referred to herein collectively as NAD functions 222 and individually as NAD function 222). As described below, the NAD functions 222 obtain information associated with the operation of the UEs 210 served by the cells of the base stations of the respective vRANs 202 and operate to exchange information to enable each of the NAD functions 222 to generate a global machine learning model of UE behavior. Each of the NAD functions 222 then uses the machine learning model that it generated to perform abnormal UE behavior detection. In addition, in some embodiments, a mapper module 224 is implemented in the core network(s) 220 to enable mobility tracking via mapping of temporary UE identifiers (e.g., T-IMSIs) in the vRANs 202 to globally unique UE identifiers (e.g., IMSIs).

Before detailing embodiments of the present disclosure, it is beneficial to first discuss a set of assumptions that describe the context in which the vRAN 202 is set up. These assumptions are as follows:

The vRANs 202 are made of virtual components running on distributed local data centers, each of which serves different base stations. For simplicity, it is assumed that there is only one vRAN per distributed local data center. However, the embodiments disclosed herein are equally applicable to scenarios in which multiple vRANs 202 are running on the same distributed local data center.

UEs 210, such as mobile and IoT devices, are connected to base stations.

Each UE 210 is identified by a unique (global) identifier (e.g., an IMSI).

Logs generated by connected UEs 210 can be captured and stored locally on each vRAN 202. Some logs may need to be transferred to other vRANs, as discussed below.

It is assumed that the clocks of the different vRANs 202 are synchronized with each other.

As illustrated in FIG. 2, the proposed solution includes deploying a separate NAD function 222 on each vRAN 202. The NAD function 222 collects data of the UEs 210 connected to the respective vRAN 202 (i.e., the UEs 210 connected to the cells served by the base stations implemented using the vRAN 202) and performs training using a machine leaning algorithm (e.g., a K-means algorithm) in order to predict normal UE behavior and detect abnormal UE behavior. The NAD functions 222 collaborate with each other to give each NAD function 222 a global model of (connected) UE behavior. Each NAD function 222 in each vRAN 202 obtains a global model profiling the behavior of all the connected UEs of the cellular communications system 200 (e.g., all vRANs 202 of the same provider).

Figure 3:
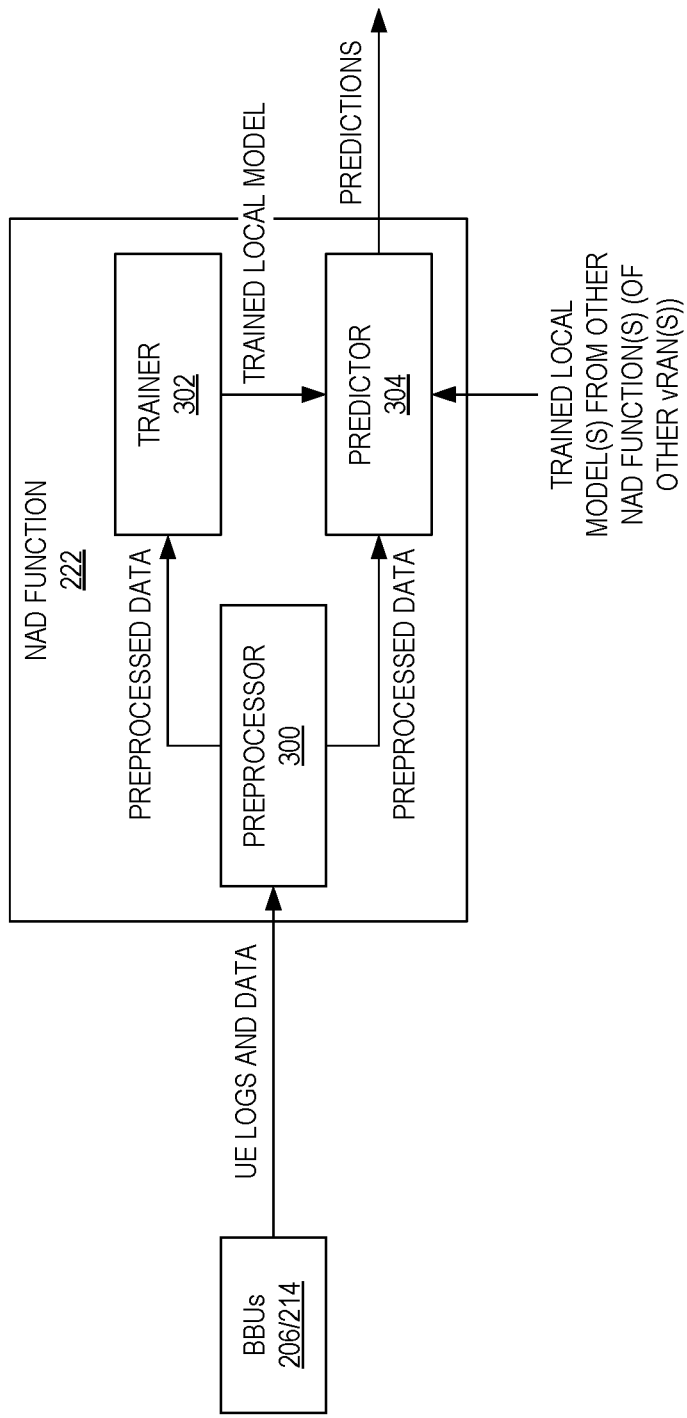
FIG. 3 illustrates one example of the Network Anomaly Detection (NAD) function in accordance with embodiments of the present disclosure.

FIG. 3 illustrates one example of the NAD function 222 (i.e., both the NAD function 222-1 and the NAD function 222-2) in accordance with embodiments of the present disclosure. As illustrated, the NAD function 222 includes a preprocessor 300, a trainer 302, and a predicator 304. The preprocessor 300 receives data and logs for UEs 210 connected to the respective vRAN 202, e.g., from the respective BBUs 206/214, parses the received data and logs, filters (i.e., removes) irrelevant information (i.e., data not needed to generate the machine learning model of UE behavior, and converts any textual information (e.g., Internet Protocols (IPs), protocol name, etc.) into a suitable form (e.g., integer representation) acceptable by the machine learning algorithm (e.g., K-Means). Then, the resulting data is sent to the trainer 302 and the predictor 304.

The trainer 302 trains a partial machine learning model (referred to herein a "partial model") of UE behavior for the UEs connected to the respective vRAN 202 based on the data received from the preprocessor 300. In machine learning words, it performs feature extraction/selection. The trainer 302 provides the partial model to the predictor 304.

The predictor 304 provides the partial model received from the trainer 302 to the NAD function(s) 222 of the other vRAN(s) 202 and receives partial models generated by the NAD function(s) 222 of the other vRAN(s) 202. Note that the NAD functions 222 may exchange the partial models themselves or data (e.g., coresets) that represent the partial models. The predictor 304 utilizes the partial models to generate a global model of (normal) UE behavior in the cellular communications system 200 and uses the global model to detect abnormal UE behavior.

Figure 4A:
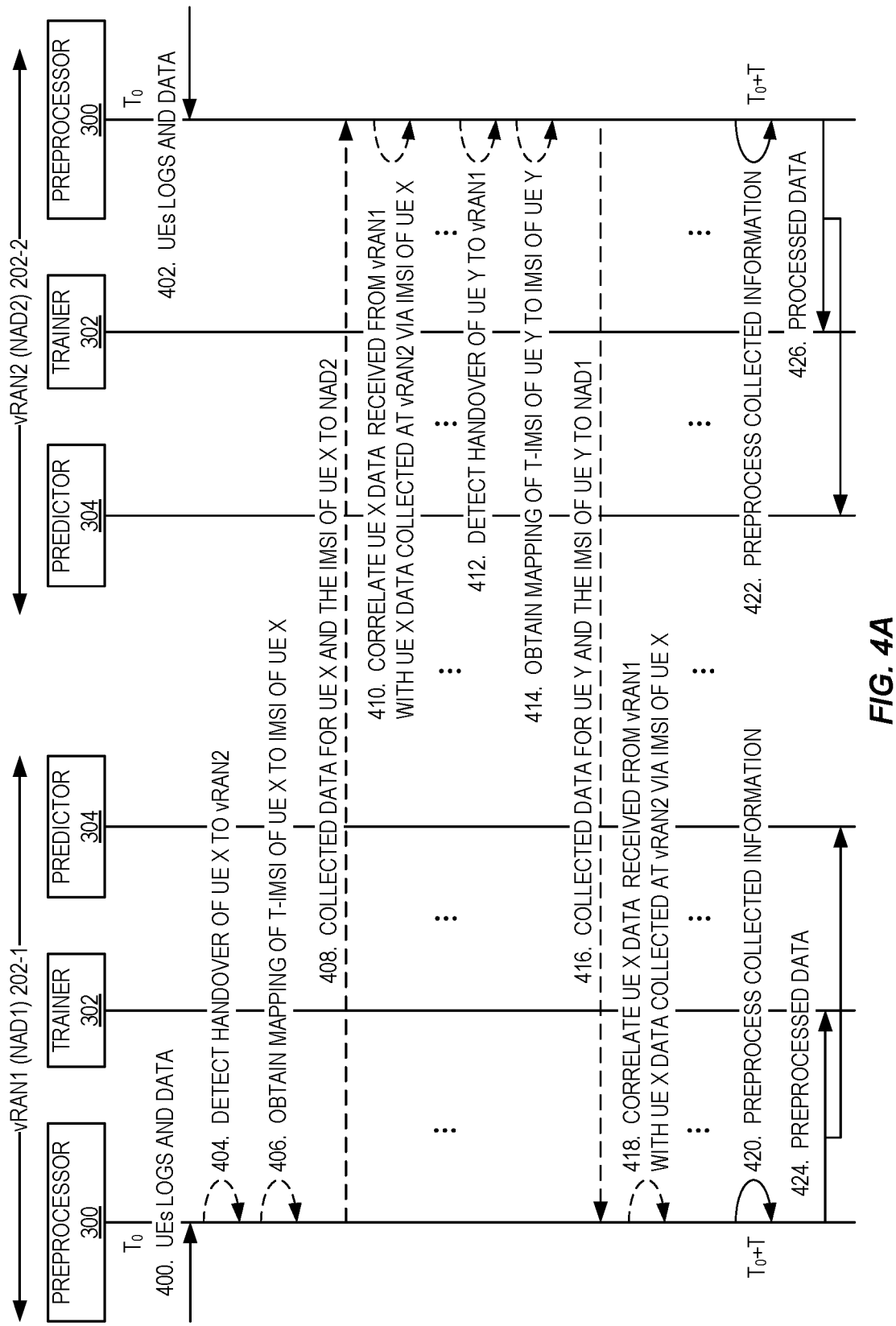
FIGS. 4A and 4B illustrate the operation of NADs of different vRANs to perform a collaborative process for training global models of UE behavior and utilizing the global models to predict, or detect, abnormal UE behavior in accordance with some embodiments of the present disclosure.
Figure 4B:
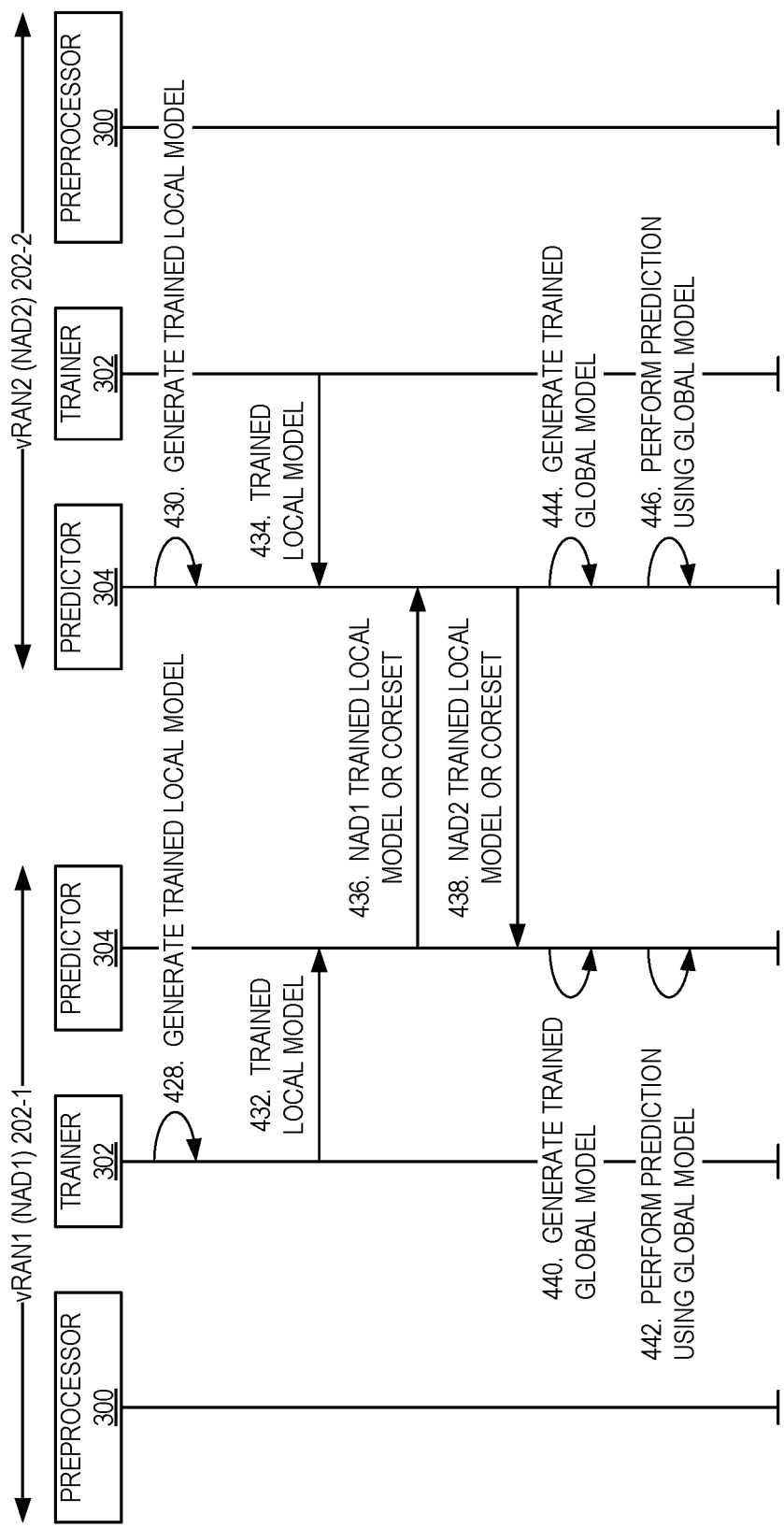

FIGS. 4A and 4B illustrate the operation of the NAD functions 222-1 and 222-2 of the vRANs 202-1 and 202-2, respectively, in accordance with some embodiments of the present disclosure. Optional steps are represented by dashed lines. As illustrated, during a time period from a time $T_0$ to a time $T_0+T$, where T is a predefined or preconfigured data collection duration, the NAD function 222-1 obtains data and logs associated with the UEs 210 connected to the vRAN 202-1 (step 400), and the NAD function 222-2 obtains data and logs associated with the UEs 210 connected to the vRAN 202-1 (step 402).

Optionally, in order to handle mobility events during the time period from the time $T_0$ to the time $T_0+T$, the NAD functions 222-1 and 222-2 operate to exchange the data and logs or some relevant portion thereof for any UEs 210 that move between the vRANs 202-1 and 202-2 during the time period from the time $T_0$ to the time $T_0+T$. As an example, if a particular UE 210 (referred to as UE1) moves from the vRAN 202-1 to the vRAN 202-2 during the time period from the time $T_0$ to the time $T_0+T$, the NAD function 222-1 and in particular the preprocessor 300 of the NAD function 222-1 detects the handover of UE1 (step 404). In addition, in this example, only the T-IMSIs of the UEs 210 are available in the vRANs 202. In order to enable the correlation of the data and logs obtained for UE1 from the vRAN 202-1 with data and logs obtained for the same UE1 from vRAN 202-2, the preprocessor 300 of the NAD function 222-1 obtains a mapping of the T-IMSI of UE1 to a globally unique identifier of UE1, which in this example is the T-IMSI of UE1 (step 406). Several examples of how this mapping can be obtained are described below. However, in some embodiments, this mapping is obtained from the mapper module 224 in the core network(s) 220. The preprocessor 300 of the NAD function 222-1 sends the data and logs obtained for UE1 or, alternatively, preprocessed data for UE1 collected in the vRAN 202-1 to the NAD function 222-2 of the vRAN 202-2 together with the IMSI of UE1 (step 408). At the NAD function 222-2, the preprocessor 300 of the NAD function 222-2 correlates the data received from the NAD function 222-1 with the data collected in the vRAN 202-2 for UE1 after the handover (step 410).

In a similar manner, if a particular UE 210 (referred to as UE2) moves from the vRAN 202-2 to the vRAN 202-1 during the time period from the time $T_0$ to the time $T_0+T$, the NAD function 222-2 and in particular the preprocessor 300 of the NAD function 222-2 detects the handover of UE1 (step 412). In addition, the preprocessor 300 of the NAD function 222-2 obtains a mapping of the T-IMSI of UE2 to a globally unique identifier of UE2, which in this example is the TMSI of UE2 (step 414). Again, several examples of how this mapping can be obtained are described below. The preprocessor 300 of the NAD function 222-2 sends the data and logs obtained for UE2 or, alternatively, preprocessed data for UE2 collected in the vRAN 202-2 to the NAD function 222-1 of the vRAN 202-1 together with the IMSI of UE2 (step 416). At the NAD function 222-1, the preprocessor 300 of the NAD function 222-1 correlates the data received from the NAD function 222-2 with the data collected in the vRAN 202-1 for UE2 after the handover (step 418).

The preprocessor 300 of the NAD function 222-1 preprocesses the data obtained for the UEs 210 connected to the vRAN 202-1 (step 420). This includes any UEs 210 handed over to the vRAN 202-1 during the time period from the time $T_0$ to the time $T_0+T$. As discussed above, preprocessing includes filtering any irrelevant data from the data and logs collected for the UEs 210 (or conversely extracting relevant data from the data and logs collected for the UEs 210) and, if needed, reformulating the data into an appropriate form for training the partial model in accordance with the desired machine learning algorithm (e.g., K-Means). In the same manner, the preprocessor 300 of the NAD function 222-2 preprocesses the data obtained for the UEs 210 connected to the vRAN 202-2 (step 422). The preprocessor 300 of the NAD function 222-1 provides the preprocessed data to both the trainer 302 and the predictor 304 of the NAD function 222-1 (step 424), and the preprocessor 300 of the NAD function 222-2 provides the preprocessed data to both the trainer 302 and the predictor 304 of the NAD function 222-2 (step 426).

The trainer 302 of the NAD function 222-1 processes the preprocessed data collected for the UEs 210 connected to the vRAN 202-1 to generate a trained partial model of UE behavior in the vRAN 202-1 (step 428). Likewise, the trainer 302 of the NAD function 222-2 processes the preprocessed data collected for the UEs 210 connected to the vRAN 202-2 to generate a trained partial model of UE behavior in the vRAN 202-2 (step 430). The NAD functions 222-1 and 222-2 then exchange their respective partial models or data representative of their partial models (e.g., coresets representing their partial models) (steps 432-438).

The NAD function 222-1, and in this example the predictor 304 of the NAD function 222-1, generates a global model of UE behavior in the cellular communications system 200 based on: (a) the partial model of UE behavior in the vRAN 202-1 generated by the NAD function 222-1 or data representative of this partial model (e.g., a coreset) and (b) the partial model of UE behavior in the vRAN 202-2 generated by the NAD function 222-2 or data representative of this partial model (e.g., a coreset) (step 440). The predictor 304 of the NAD function 222-1 then performs detection of abnormal UE behavior based on the generated global model (step 442). In particular, the predictor 304 validates the preprocessed data of received in step 424 against the generated global model. Likewise, the NAD function 222-2, and in this example the predictor 304 of the NAD function 222-2, generates a global model of UE behavior in the cellular communications system 200 based on: (a) the partial model of UE behavior in the vRAN 202-1 generated by the NAD function 222-1 or data representative of this partial model (e.g., a coreset) and (b) the partial model of UE behavior in the vRAN 202-2 generated by the NAD function 222-2 or data representative of this partial model (e.g., a coreset) (step 444). The predictor 304 of the NAD function 222-2 then performs detection of abnormal UE behavior based on the generated global model (step 446). In particular, the predictor 304 validates the preprocessed data of received in step 426 against the generated global model.

The details of generation of the partial models in steps 428 and 430 and the generation of the global models in steps 440 and 444 will vary depending on the desired machine learning algorithm used. As an example, the details for K-means are described below.

Note that, at each interval of time T, the collected data for each vRAN 202 is preprocessed by the respective preprocessor 300 and provided to the respective trainer 302 to update the partial model of UE behavior for that vRAN 202. In addition, for each interval of time T, the preprocessed data for each vRAN 202 is analyzed, by the respective predictor 304, against the global model generated by the respective NAD function 222 to detect any UE 210 served by the vRAN 202 that is exhibiting abnormal UE behavior. Note that the predictor 304 uses a new (updated) global model at each interval of time T. In some embodiments, the preprocessed data is generated continuously during each interval of time T and provided to the predictor 304 such that the training of the model used for prediction can be performed continuously (e.g., by using streaming analytic methods) during each interval of time T, rather than at the conclusion of each interval of time T. In some other embodiments, the predictor 304 is run at regular intervals smaller that T. In some other embodiments, the predictor 304 is run at the same interval of time T.

Note that, in the process described above, the NAD functions 222 exchange information that enables each NAD function 222 to separately generate a global model of UE behavior. In this regard, this collaborative process is different than a distributed machine learning model generation process in which a central node collects data from various subnodes and generates a machine learning model based on the collected data. In such a distributed process, the model is only generated at and available to the central node. Conversely, in the collaborative process described herein, each NAD function 222 independently generates its own global model which it can then use locally to detect abnormal UE behavior in the respective vRAN 202.

Now, a detailed description of one example embodiment of the training of the partial models, generation of coresets to represent that partial models that are then exchanged between the NAD functions 222, and the generation of the global models at each NAD function 222 will be provided. In this example, the machine learning algorithm is K-Means. However, the present disclosure is not limited thereto. As an overview, training is achieved as follows:

1. After the interval of time T is reached, all locally collected and received data is sent to the local trainer 302. This way, at each interval T, the trainers 302 of the NAD functions 222 of all of the vRANs 202 start training the data to build their respective models. Note that all NAD functions 222 are synchronized to perform this task at the same time.
2. Then, each NAD function 222 generates a partial model and representation this partial model, which is referred to as a coreset.
3. At each NAD function 222, the trainer 302 receives all coresets from all other NAD functions 222.
4. At each NAD function 222, the NAD function 222 generates its own global model of UE behavior based on the coreset of its own partial model and the coresets of the partial models generated by all of the other NAD functions 222. In this way, each of the NAD functions 222 independently generates the same global model. As such, the same global model is used in each vRAN 202 at each interval time T.

In this manner, each NAD function 222 (i.e., each vRAN 202) has a trained global model of the behavior of all the UEs 210 connected to all the vRANs 202, e.g., of the same operator. This way, UEs 210 can move from one vRAN 202 to another vRAN 202 seamlessly without any loss in their behavior modeling.

When using K-Means, the collaborative process for generating the trained global model at each of the NAD functions 222 is referred to herein as a "collaborative K-Means" process. In the collaborative K-means process, in each vRAN 202, the NAD function 222 for that vRAN 202 clusters the data collected and generates a coreset, which will be sent to the other NAD functions 222 of the other vRANs 202. In addition, upon receiving the coresets from the other NAD functions 222, the NAD function 222 merges all the coresets (its coreset and the received ones) and generates a new global model of UE behavior. Before detailing the collaborative K-means process for the vRANs 202, it is beneficial to first explain the concept of a coreset.

In general, a "coreset" is a succinct, small summary of a larger data set. In the context of the present disclosure, the coreset is data that represents (i.e., summarizes) a partial model. Note that the concept of a coreset is not limited to a K-means model, but applies to any type of data/model. As is well-known by those of skill in the art, a K-Means model defines clusters, centroids, and points of each cluster. Thus, after the trainer 302 of the NAD function 222 has generated its partial model (i.e., clusters, centroids, and points of each cluster), a subset of that partial model is extracted and sent to the other NAD functions 222. Therefore, instead of sending the entire data for the partial model, a subset of points approximating the entire model is extracted and exchanged between the NAD functions 222. This subset represents the original model with very small error and is referred to as the coreset. This coreset can be sent with less communication bandwidth consumption.

There are many known approaches to generating a coreset, each having its own efficiency level. A short list of these approaches is as follows:
Coreset Streaming Reduction,
Bi-Criteria K-Clustering Approximation,
K-Center Coresets Using Bi-Criteria K-Clustering, and
K-Means/Median Coresets Using Hand Waving.

Bi-Criteria K-Clustering Approximation Coreset Generator: In this coreset generation approach, the coreset construction starts from a set of randomly selected points. It does not rely on any clustering. The pseudocode of the original Bi-Criteria K-Clustering approximation method (Trevino, "Introduction to K-means Clustering," Oracle, 2018 (hereinafter "Trevino")) has been rewritten and presented in Algorithm 1 below. A proof of correctness of this algorithm is presented in Trevino.

---

Algorithm 1: Pseudo-code of coreset generation using the Bi-criteria k clustering approximation method

---

```
/* This is coreset generation pseudo-code using the
Bi-criteria k clustering
approximation. In this method, the seeds are selected randomly.*/
Function bi_criteria_k_clustering_approx_corset(P_i, k)
|   input:
|       k: number of Clusters
|       P_i: set of connections in vRAN_i, P_i = {p_i^1, p_i^2, ..., p_i^n}
|       /*each connection is a point */
|   output:
|       S_i: coreset of NAD_i
|   S_i = φ
|   while P_i ≠ φ do
|   |   /* Select randomly a subset of points,
|   |   the size of which is O(k.log(n))*/
|   |   S_t ← P_i', s.t. P_i' ⊂ P_i and | P_i' |= O(k.log(n))
|   |   /*Add the selected subset to the coreset*/
|   |   S_i ← S_i ∪ S_t
|   |   /* Select a subset of points, the size of which is half
|   |   of original set of points. These points should be the
|   |   closest ones to the already extracted
|   |   subset */
|   |   S_t ← P_i'', s.t. P_i'' ⊂ P_i and | P_i'' |=| P_i | /2 and
|   |   {P_i''} are closest to S_t
|   |   /* Update the original set of points by removing
|   |   the selected subsets of points */
|   |   P_i ← P_i - S_i
|   end
|   return S_i
end
```

Proposed Coreset Generator: In one example embodiment, the coresets are generated using an adapted version of the Bi-Criteria K-Means clustering approximation method (Trevino). Instead of starting with random points, the adapted method starts with the centroids and their closest points. In this way, the clustering that has been done on the points is leveraged, and so the obtained coreset will preserve the clustering. The pseudo-code of the proposed coreset generator is presented in Algorithm 2.

---

Algorithm 2: Our Coreset Generator pseudo-code

---

/* This is our coreset generation pseudocode. It is an adapted version of the previous one, in which we start generating the coreset from the centroids. The seeds are the set Algorithm 2: Our Coreset Generator pseudo-code

```
of points that are the closet to the centroids.*/
Function our_corset(P_i, C_i, k)
| input:
|   k: number of Clusters
|   P_i: set of connections in vRAN_i, P_i = {p_i^1, p_i^2, ..., p_i^n}
|   C_i: set of NAD_i Centroids, C_i = {c_i^1, c_i^2, ..., c_i^k}
| output:
S_i: coreset of NAD_i.
|   S_i = φ
|   while P_i ≠ φ do
|   |   /* Select a subset of points, the size of which is O(k.log(n)).
|   |   These points includes the centroids and their closest points */
|   |   S_t ← P_i', s.t. P_i' ⊂ P_i and | P_i' |= O(k.log(n)) and
|   |   {P_i'} are closest to C_i
|   |   /*Add the selected subset to the coreset*/
|   |   S_i ← S_i ∪ S_t
|   |   /*Select a subset of points, the size of which is half
|   |   of original set of points. These points should be the
|   |   closest ones to the already extracted
|   |   subset */
|   |   S_t ← P_i", s.t. P_i" ⊂ P_i and | P_i" |=| P_i | /2 and
|   |   {P_i"} are closest to S_t
|   |   /* Update the original set of points by removing
|   |   the selected subsets of points */
|   |   P_i ← P_i - S_t
|   end
|   return S_i
end
```

Now, the proposed collaborative K-means solution is described, which summarizes the aforementioned details, and translates the flowchart, presented in FIGS. 4A and 4B, into practical pseudo-code. This solution is depicted in Algorithm 3. It is assumed that, at regular intervals, each NAD function 222 updates its partial model (new clustering on newly collected data) and exchange it with the other NAD functions. This operation would then result in the same new global model inside each NAD function 222.

Note that in the pseudo code presented in Algorithm 3, the number of connections from a UE is used as the feature to be measured for modeling UEs normal or abnormal behavior. The number of connections is an example here and it could be replaced by any other feature or a combination of features to be measured to model UEs normal or abnormal behavior. For example, in some embodiments, feature(s) (also referred to herein as parameters) that are indicative of UE behavior include a number of connections made by the UE during the period of time, an average bandwidth used by the UE during the period of time, frequency and/or length of the connections made by the UE during the time period, and/or signaling anomalies for the UE.

Algorithm 3: Collaborative K-Means pseudo-code

```
/*Collaborative K-means pseudo-code.*/
Function collaborative_K.means(P_i, k)
| input:
|   N: number of NAD agents in the vRAN network
|   n: number of connections collected
|   k: number of Clusters
|   P_i: set of connections in vRAN_i, P_i = {p_i^1, p_i^2, ..., p_i^n}
| output:
|   C_i: set of NAD_i Centroids, C_i = {c_i^1, c_i^2, ..., c_i^k}
|   L_i: set of NAD_i Labels, L_i = {l_i^1, l_i^2, ..., l_i^n}
|   C_i*: set of NAD_s Centroids, C_i* = {c_i^{*1}, c_i^{*2}, ..., c_i^{*k}}
|   S_i: coreset of NAD_i
|   L_i*: set of all NADs Labels
| begin
|   |   /* Perform k-means clustering on local data*/
|   |   (C_i, L_i) ← k.means(P_i, k)
|   |   /* Generate the coreset on the locally clustered data*/
|   |   S_i ← our_corset(P_i, C_i, k)
|   |   /* Exchange coresets with the other NAD agents */
|   |   forall 1 ≤ j ≤ N and j ≠ i do
|   |   |   send (NAD_j, S_i)
|   |   |   receive (NAD_j, S_j)
|   |   end
|   |   /* Aggregate local and received coresets*/
|   |   P_i* ← ∪_{j=1}^{N} S_j
|   |   /* Perform k-means clustering on global data*/
|   |   (C_i*, L_i*) ← k_means(P_i*, k)
|   end
|   return (C_i*, L_i*)
end
```

Without loss of generality, it is assumed that the k-means function called in Algorithm 3 is implemented using any existing implementation.

Using the trained global model, the predictor 304 of each NAD function 222 uses the trained global model and the preprocessed data for the respective vRAN 202 to cluster the UEs among different clusters. Some of the clusters are considered to characterize the UEs presenting malicious or bogus behavior. As an example, any time a UE 210 is considered to exhibit abnormal behavior (e.g., bogus, malicious, bots), the Identifier (ID) of the UE 210 (e.g., UE's IMSI) is reported to security management for the appropriate actions.

Now, turning to mobility, the collaborative process for generating the global model at each of the NAD functions 222 is, at least in some embodiments, capable of handling mobility events. For instance, in the process of FIGS. 4A and 4B, the collected data or some subset thereof or preprocessed data for a UE 210 that moves from the vRAN 202-1 to the vRAN 202-2 during the time period from $T_0$ to $T_0+T$ is provided from the NAD function 222-1 to the NAD function 222-2 together with a globally unique identifier (e.g., IMSI) of that UE 210. One issue that arises is that RANs, such as the vRANs 202-1 and 202-2, only have access to the UE's T-IMSI per current 3GPP standards. A discussion will now be provided of a number of embodiments that enable mapping of the T-IMSI of the UE 210 to the IMSI of the UE 210 such that the data collected in the vRAN 202-1 can be correlated to data collected in the vRAN 202-2 for the same UE 210 after the handover.

As explained above:
  The data and logs associated with different UEs 210 are collected in vRAN components running in the vRANs 202-1 and 202-2 and are sent to the respective NAD functions 222-1 and 222-2.
  At the NAD functions 222-1 and 222-2, the data is processed at time intervals T and used for training the partial models.
  When a particular UE 210 moves from the vRAN 202-1 to the vRAN 202-2 before the end of time period T is reached, the NAD function 222-1 sends the collected UE's data to the vRAN 202-2. Corresponding mapping information for the UE 210 is also sent with the corresponding data. Note that this mapping information depends on the particular mobility tracking solution, examples of which are described below. For example, if mobility tracking solution 3 is chosen below, this mapping information can be the T-IMSI in the vRAN 202-1 and UE's IMSI.

When that UE 210 connects to the vRAN 202-2, the NAD function 222-2 in the newly attached vRAN 202-2 adds the received data and corresponding mapping information for the UE 210 into its local logs. The new logs for the UE 210 are then added to the local logs and data for that UE 210.

One challenge in this approach is to deal with UE mobility, i.e., when a UE 210 moves from one vRAN 202 (called origin vRAN) to another vRAN 202 (called destination vRAN). This happens when the UE 210 moves and its connection is handed over from one vRAN 202 to another vRAN 202. This means that over time, the UE 202 is monitored by different NAD functions 222 in different vRANs 202. In this case, the collected data for the UE 210 in the NAD function 222 in the origin vRAN 202 is not accessible to the NAD function 222 in the destination vRAN 202, and some information collected for that UE 210 during the time interval T will be lost unless this issue is addressed. To address this issue, a mechanism is needed to allow tracking of the UEs 210 across different vRANs 202. The IMSI uniquely identifies a UE 210; therefore, the IMSI can be used to track a UE 210 in the cellular communications system 200. However, for privacy issues, the 3GPP standardization imposes that IMSIs are not known in RAN, and the same is true for 5G. To this end, after authentication, each UE 210 is assigned a T-IMSI. Clearly, this means that the UE 210 cannot be tracked when it moves from one vRAN 202 to another using T-IMSI. Therefore, to benefit from historical knowledge about different UEs 210, when moving from one vRAN 202 to another, a mobility tracking solution may be used. In this regard, four mobility tracking solutions are described below.

Figure 5:
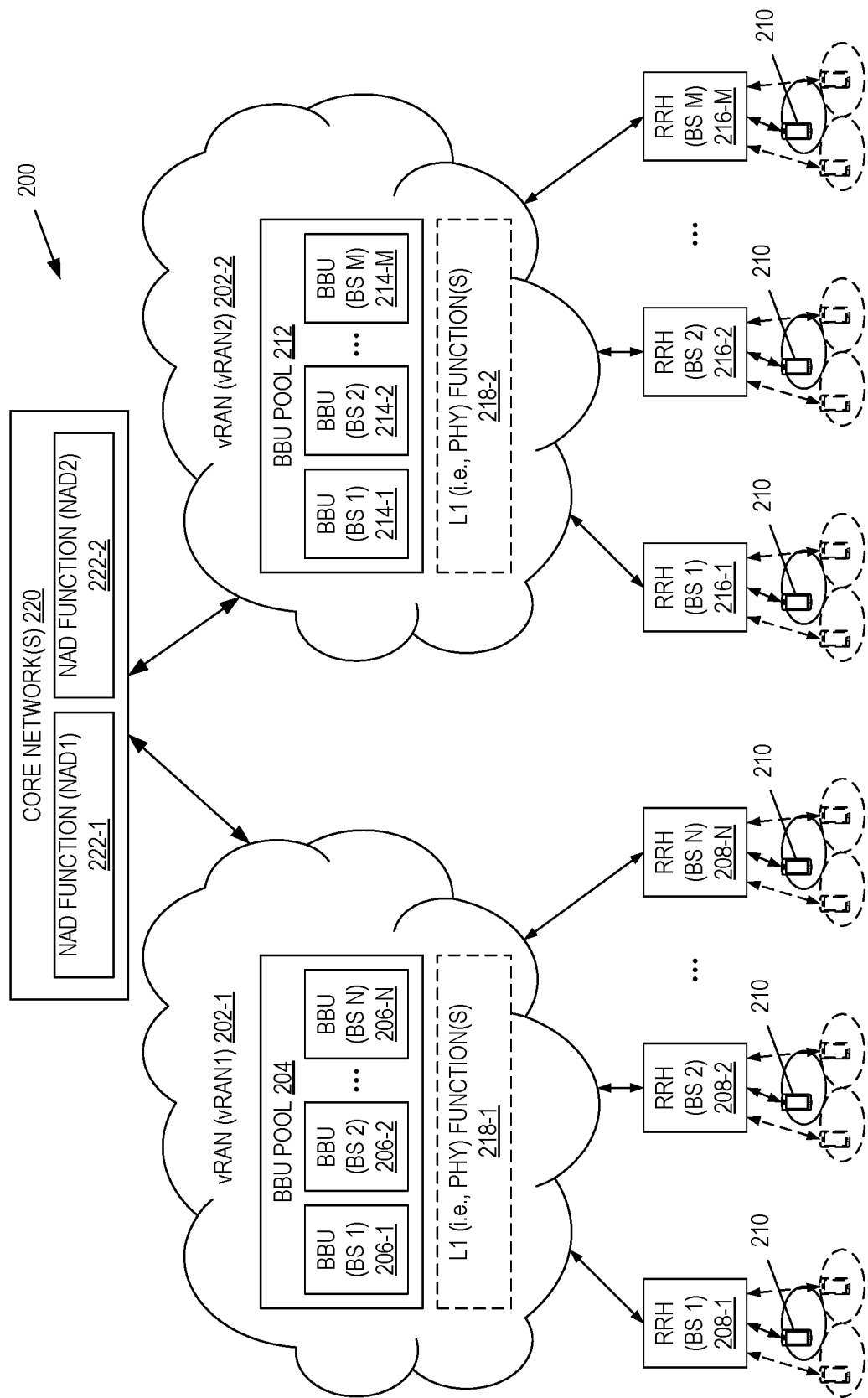
FIGS. 5 and 6 illustrate two example variants of the architecture of FIG. 2 in accordance with some other embodiments of the present disclosure.

Mobility Tracking Solution 1: For the first mobility tracking solution, the NAD functions 222 are moved from the vRANs 202 to the core network(s) 220 (e.g., close to the Mobility Management Entity (MME) or Authentication Management Function (AMF)). This way, the NAD function 222 can obtain IMSIs of the UEs 210 and be able to track them. Mobility Tracking Solution 1 is illustrated in FIG. 5.

Figure 6:
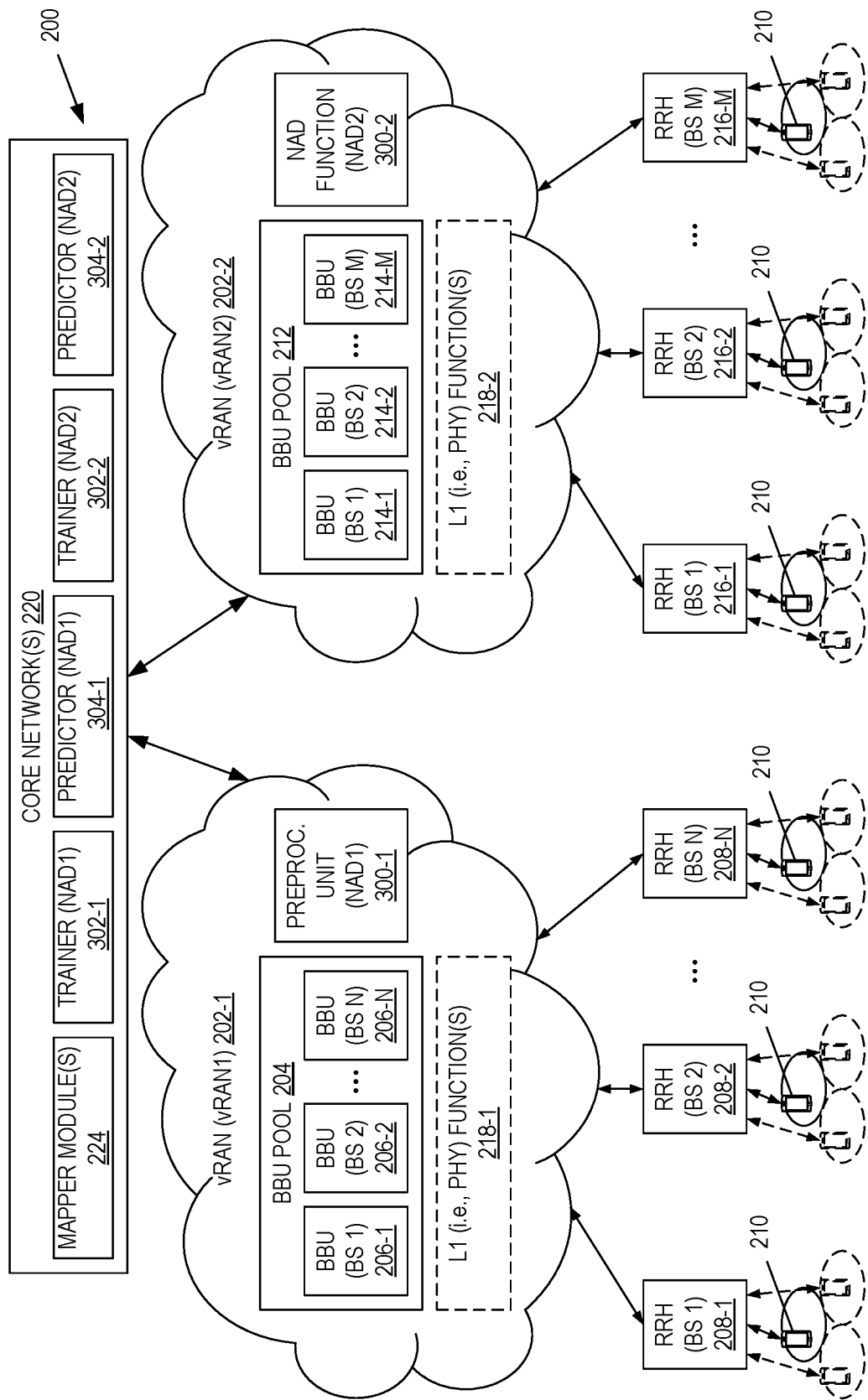

Mobility Tracking Solution 2: For the second mobility tracking solution, a split architecture is used for the NAD functions 222. In particular, each NAD function 222 is split between the vRAN 202 and the core network(s) 220. In particular, the trainers 302 and the predictors 304 of the NAD functions 222 are moved to the core network(s) 220 (e.g., close to the MME or AMF), while the preprocessors 300 remain in the vRANs 202. This is illustrated in FIG. 6 where the preprocessors 300 of the NAD functions 222-1 and 222-2 are referenced as the preprocessors 300-1 and 300-2, the trainers 302 of the NAD functions 222-1 and 222-2 are referenced as the trainers 302-1 and 302-2, and the predictors 304 of the NAD functions 222-1 and 222-2 are referenced as the predictors 304-1 and 304-2.

The trainers 302 and the predictors 304 still receive IMSIs for different UEs 210 from, e.g., the MME or AMF, which they use to track the UEs 210 and therefore build the model. The preprocessed data still comes from the preprocessors 300 located in the vRANs 202. This means that each NAD function 222 is distributed between core network(s) 220 (e.g., the MME or AMF) and the respective vRAN 202, where the components of the NAD function 222 operate in collaboration. However, inside the vRANs 202, the IMSIs of the UEs 210 are not accessible, and T-IMSIs are used instead by the preprocessors 300. This means that the same UE 210 may have different IDs in different vRANs 202. To address this, the mapper module(s) 224, in collaboration with the MME or AMF, creates and stores a mapping between IMSI and T-IMSI for each UE 210. The mapper module(s) 224 can be used by the trainers 302 and predictors 304 to map T-IMSIs received from the preprocessors 300 to IMSIs. Note that the mapper module(s) 224, while shown separately, can be implemented as part of the trainers 302 and/or predictors 304 or as an external component.

This solution has the advantage of respecting the privacy for UEs 210 in the vRANs 202. As the mapper module(s) 224 is in the core network(s) 220, e.g., close to the MME or AMF, this solution is fully compliant with 3GPP standards as it does not reveal UE IDs in the vRAN 202. Additionally, it is distributed as there are several MMEs/AMFs in large systems.

Mobility Tracking Solution 3: For the third mobility tracking solution, the NAD functions 222 are implemented in the vRANs 202 and the mapper module(s) 224 are implemented in the core network(s) 220, e.g., close to the MME/AMF. This is the solution illustrated in FIG. 2. This solution includes deploying the NAD functions 222 (preprocessors 300, trainer 302, and predictors 304) in the vRANs 202. In this case, to keep track of moving UEs 210, the mapper module(s) 224 is implemented in the core network(s) 220, e.g., close to the MME/AMF. The mapper module(s) 224 handles the mapping between T-IMSI and IMSI. Each time a UE 210 is connected to the vRAN 202, its IMSI is requested from mapper module(s) 224 by the NAD function 222. This way, at any time, the NAD function 222 will be using the IMSI, instead of the T-IMSI.

The advantage of this solution is in the fact that the NAD functions 222 are entirely deployed in the vRANs 202, i.e., much closer the end-user than the information being handled in a cloudlet or in core network(s) 220 for the train and prediction. That is, in this solution, the monitoring and predictions functions are implemented much closer to the end-user.

Mobility Tracking Solution 4: In this solution, a new ID specific to the NAD functions 222 is created for each UE 210. The NAD functions 222 are deployed in the vRANs 202, as explained in the previous solution. Similarly, the mapper module(s) 224 is deployed in the core network(s) 220, e.g., close to the MME/AMF. But, instead of requesting the IMSI from the mapper module(s) 224, a new ID is created for each UE 210, which associates each T-IMSI with its IMSI. Let the new ID be called "UE_id". Thus, when a new UE 210 is detected in the vRAN 202, its UE_id is requested by the NAD function 222. The mapper module(s) 224 provides a UE_id for that UE 210 according to its map between IMSI and T-IMSI. If it is the first time that the UE 210 is connecting to the network, a new ID is created by the mapper module(s) 224 for the UE 210 and sent back to the NAD function 222. The advantage of this solution is that the IMSI is never sent to the vRAN 202, which satisfies the 3GPPP standard.

Figure 7:
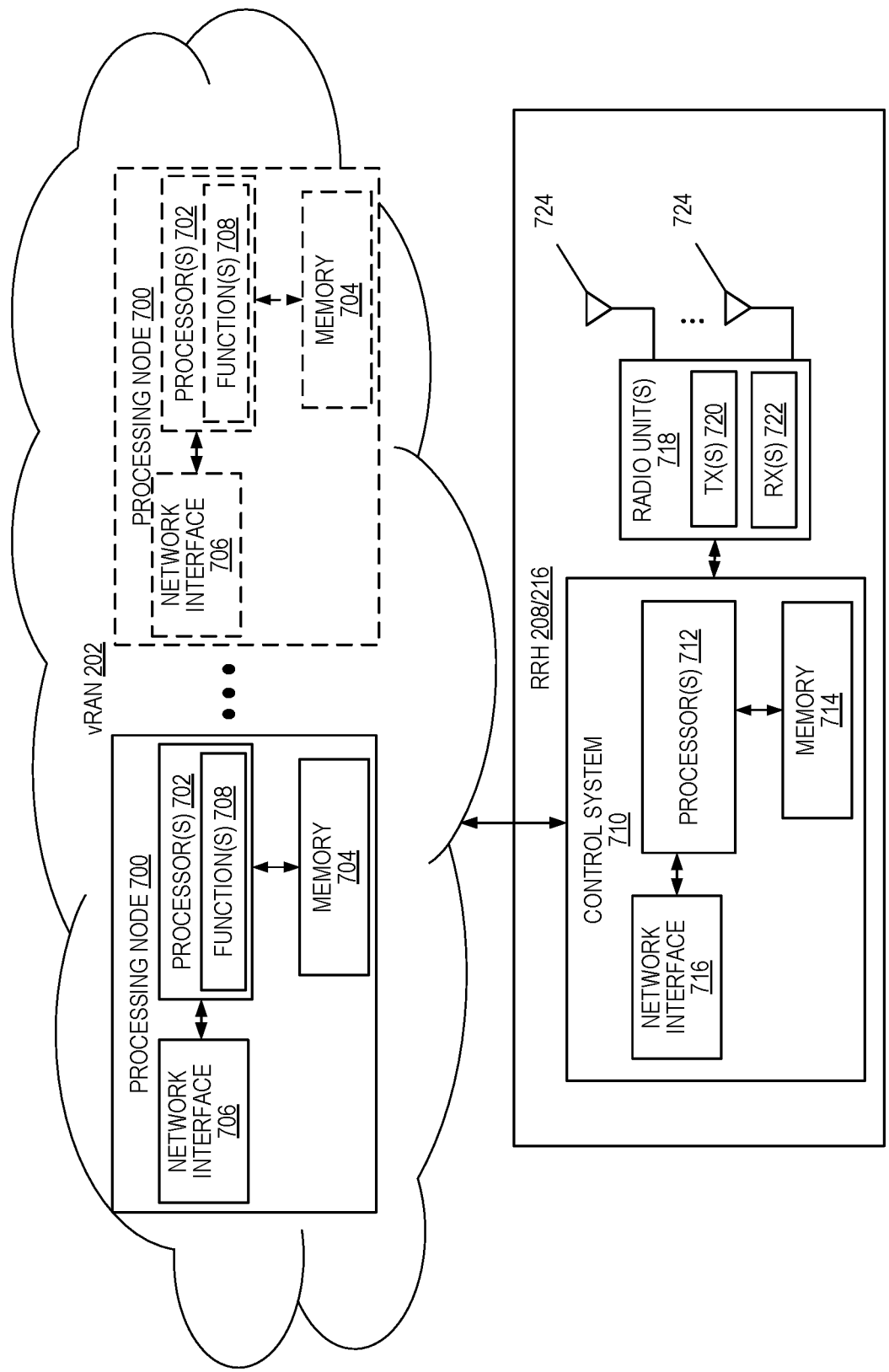
FIG. 7 is an illustration of one example implementation of a vRAN and a Remote Radio Head (RRH) forming a base station in accordance with some embodiments of the present disclosure.

FIG. 7 is a schematic block diagram that illustrates the vRAN 202 and the RRH 208/216 forming a base station in accordance with at least some embodiments of the present disclosure. Here, at least a portion of the functionality of the base station is implemented as a virtual component(s) (e.g., via a virtual machine(s) executing on a physical processing node(s) in a network(s)). As illustrated, in this example, the vRAN 202 includes one or more processing nodes 700, each of which includes one or more processors 702 (e.g., Central Processing Units (CPUs), Application Specific Integrated Circuits (ASICs), Field Programmable Gate Arrays (FPGAs), and/or the like), memory 704, and a network interface 706. Functions 708 of the vRAN 202 described herein (e.g., the functionality of the BBUs 206/214, the functionality of the L1 function(s) 218-1/218-2 (optional), and the functionality of the NAD function 222 are implemented in software that is stored in the memory 704 and executed by the processor(s) 702.

The RRH 208/216 includes, in this example, a control system 710 that includes one or more processors 712 (e.g., CPUs, ASICs, FPGAs, and/or the like), memory 714, and a network interface 716. The one or more processors 712 are also referred to herein as processing circuitry. In addition, the RRH 208/216 includes one or more radio units 718 that each includes one or more transmitters 720 and one or more receivers 722 coupled to one or more antennas 724. The radio units 718 may be referred to or be part of radio interface circuitry. In some embodiments, the radio unit(s) 718 is external to the control system 710 and connected to the control system 710 via, e.g., a wired connection (e.g., an optical cable). However, in some other embodiments, the radio unit(s) 718 and potentially the antenna(s) 724 are integrated together with the control system 710. The one or more processors 712 operate to provide one or more functions of a RRH 208/216 as described herein. Note that the control system 710 is optional and the radio unit(s) 718 may alternatively be connected to the vRAN 202 via an appropriate interface.

In some embodiments, a computer program including instructions which, when executed by at least one processor, causes the at least one processor to carry out the functionality of the vRAN 202 or a component of the vRAN 202 (e.g., the NAD function 222) according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processors (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

At least some of the following abbreviations may be used in this disclosure. If there is an inconsistency between abbreviations, preference should be given to how it is used above. If listed multiple times below, the first listing should be preferred over any subsequent listing(s).
- 3GPP Third Generation Partnership Project
- 5G Fifth Generation
- 5GC Fifth Generation Core
- AMF Authentication Management Function
- ASIC Application Specific Integrated Circuit
- BBU Baseband Unit
- CPU Central Processing Unit
- CU Central Unit
- DSP Digital Signal Processor
- DU Distributed Unit
- eNB Enhanced or Evolved Node B
- EPC Evolved Packet Core
- FPGA Field Programmable Gate Array
- gNB New Radio Base Station
- ID Identifier
- IMSI International Mobile Subscriber Identity
- IoT Internet of Things
- IP Internet Protocol
- LTE Long Term Evolution
- MME Mobility Management Entity
- NAD Network Anomaly Detection
- NR New Radio
- RAM Random Access Memory
- RAN Radio Access Network
- ROM Read Only Memory
- RRH Remote Radio Head
- T-IMSI Temporary International Mobile Subscriber Identity
- TS Technical Specification
- UE User Equipment
- vRAN Virtualized Radio Access Network Those skilled in the art will recognize improvements and modifications to the embodiments of the present disclosure. All such improvements and modifications are considered within the scope of the concepts disclosed herein.

What is claimed is:

1. A method of operation of a first Network Anomaly Detection, NAD, function associated with a first Radio Access Network, RAN, for predicting normal and/or abnormal User Equipment, UE, behavior in a cellular communications system, comprising:
   during a period of time from a time $T_0$ to a time $T_{0+T}$:
      obtaining information regarding a plurality of UEs served by the first RAN;
      detecting that a particular UE has moved from the first RAN to a second RAN; and
      sending at least some of the information regarding the particular UE to a second NAD function associated with the second RAN;
   producing a trained partial machine learning model of UE behavior for the first RAN based on at least some of the information regarding the plurality of UEs;
   sending, to the second NAD function associated with the second RAN, the trained partial machine learning model of UE behavior for the first RAN or information that is representative of the trained partial machine learning model of UE behavior for the first RAN;
   receiving, from the second NAD function associated with the second RAN, a trained partial machine learning model of UE behavior for the second RAN or information that is representative of the trained partial machine learning model of UE behavior for the second RAN;
   generating a trained global model of UE behavior based on: (a) the trained partial machine learning model of UE behavior for the first RAN or information that is representative of the trained partial machine learning model of UE behavior for the first RAN and (b) the trained partial machine learning model of UE behavior for the second RAN or information that is representative of the trained partial machine learning model of UE behavior for the second RAN; and performing a prediction of abnormal UE behavior of a particular UE served by the first RAN based on the trained global model of UE behavior, wherein sending, to the second NAD function associated with the second RAN, the trained partial machine learning model of UE behavior for the first RAN or information that is representative of the trained partial machine learning model of UE behavior for the first RAN comprises:

sending, to the second NAD function associated with the second RAN, a coreset that is representative of the trained partial machine learning model of UE behavior for the first RAN;

generating the coreset from the trained partial machine learning model, wherein the trained partial machine learning model is a K-means clustering model, and generating the coreset from the trained partial machine learning model comprises generating the coreset from the trained partial machine learning model using a variation of bi-criteria K-means clustering approximation that starts with centroids of the trained partial machine learning model and their closest points.

2. The method of claim 1, wherein the first RAN is a first virtualized RAN, vRAN, and the second RAN is a second vRAN.

3. The method of claim 1, wherein producing the trained partial machine learning model of UE behavior for the first RAN comprises:

preprocessing at least some of the information regarding the plurality of UEs to obtain, for each of at least some of the plurality of UEs, one or more values for one or more respective parameters that are indicative of UE behavior of the UE during the period of time; and generating the trained partial machine learning model of UE behavior for the first RAN based on the one or more values for the one or more respective parameters for each of the at least some of the plurality of UEs.

4. The method of claim 3, wherein the one or more parameters that are indicative of UE behavior comprise:

a number of connections made by the UE during the period of time;

an average bandwidth used by the UE during the period of time;

frequency and/or length of the connections made by the UE during the time period, and/or signaling anomalies for the UE.

5. The method of claim 3, wherein:

generating the trained partial machine learning model of UE behavior for the first RAN comprises generating the trained partial machine learning model of UE behavior for the first RAN based on the one or more values for the one or more respective parameters for each of the at least some of the plurality of UEs using K-means clustering; and generating the trained global model of UE behavior comprises generating the trained global model of UE behavior based on: (a) the trained partial machine learning model of UE behavior for the first RAN or information that is representative of the trained partial machine learning model of UE behavior for the first RAN and (b) the trained partial machine learning model of UE behavior for the second RAN or information that is representative of the trained partial machine learning model of UE behavior for the second RAN, using K-means clustering.

6. The method of claim 1, wherein the trained partial machine learning model of UE behavior for the first RAN and the trained global model of UE behavior are machine learning models.

7. The method of claim 1, further comprising, during the period of time from the time $T_0$ to the time $T_{0+T}$, obtaining a mapping of a temporary identifier of the particular UE used in the first vRAN to a global identifier of the particular UE.

8. The method of claim 7, wherein sending the at least some of the information regarding the particular UE to the second NAD function associated with the second RAN comprises sending the at least some of the information regarding the particular UE to the second NAD function associated with the second RAN together with the global identifier of the particular UE.

9. The method of claim 7, wherein the temporary identifier of the particular UE is a Temporary International Mobile Subscriber Identity, T-IMSI, assigned to the UE in the first RAN, and the trained global identifier of the particular UE is an International Mobile Subscriber Identity, IMSI, of the UE.

10. The method of claim 7, wherein the temporary identifier of the particular UE is a T-IMSI assigned to the UE in the first RAN, and the trained global identifier of the particular UE is an IMSI of the UE.

11. The method of claim 7, wherein the first NAD function is implemented in the first RAN.

12. The method of claim 11, wherein obtaining the mapping of the temporary identifier of the particular UE used in the first RAN to the global identifier of the particular UE comprises obtaining the mapping from a mapping function implemented in a core network associated with the first RAN.

13. The method of claim 7, wherein the first NAD function is implemented in a core network associated with the first RAN.

14. The method of claim 13, wherein obtaining the mapping of the temporary identifier of the particular UE used in the first RAN to the global identifier of the particular UE comprises obtaining the mapping from a core network function in the core network associated with the first RAN.

15. The method of claim 7, wherein the first NAD function is implemented in a distributed manner such that the first NAD function comprises one or more components implemented in the first RAN and one or more components implemented in a core network associated with the first RAN.

16. The method of claim 15, wherein:

obtaining the information regarding the plurality of UEs served by the first RAN comprises obtaining, by a component of the first NAD function implemented in the first RAN, the information regarding the plurality of UEs served by the first RAN;

the method further comprises providing the information from the component of the first NAD function implemented in the first RAN to a component of the first NAD function implemented in the core network associated with the first RAN; and obtaining the mapping of the temporary identifier of the particular UE used in the first RAN to the global identifier of the particular UE comprises obtaining, by the component of the first NAD function implemented in the core network associated with the first RAN, the mapping from a network function or core network entity in the core network associated with the first RAN.

17. A method of operation of a first Network Anomaly Detection, NAD, function associated with a first Radio Access Network, RAN, for predicting normal and/or abnormal User Equipment, UE, behavior in a cellular communications system, comprising:
during a period of time from a time $T_0$ to a time $T_{0+T}$:
obtaining information regarding a plurality of UEs served by the first RAN;
receiving, from a second NAD function associated with a second RAN, information regarding a particular UE that moved from the second RAN to the first RAN during the period of time; and
correlating the information regarding the particular UE received from the second NAD function associated with the second RAN with information regarding the particular UE obtained while the particular UE was being served by the first RAN during the period of time;
producing a trained partial machine learning model of UE behavior for the first RAN based on at least some of the information regarding the plurality of UEs and the information regarding the particular UE received from the second NAD function associated with the second RAN;
sending, to the second NAD function associated with the second RAN, the trained partial machine learning model of UE behavior for the first RAN or information that is representative of the trained partial machine learning model of UE behavior for the first RAN;
receiving, from the second NAD function associated with the second RAN, a trained partial machine learning model of UE behavior for the second RAN or information that is representative of the trained partial machine learning model of UE behavior for the second RAN;
generating a trained global model of UE behavior based on: (a) the trained partial machine learning model of UE behavior for the first RAN or information that is representative of the trained partial machine learning model of UE behavior for the first RAN and (b) the trained partial machine learning model of UE behavior for the second RAN or information that is representative of the trained partial machine learning model of UE behavior for the second RAN; and
performing a prediction of abnormal UE behavior of a particular UE served by the first RAN based on the trained global model of UE behavior,
wherein sending, to the second NAD function associated with the second RAN, the trained partial machine learning model of UE behavior for the first RAN or information that is representative of the trained partial machine learning model of UE behavior for the first RAN comprises:
sending, to the second NAD function associated with the second RAN, a coreset that is representative of the trained partial machine learning model of UE behavior for the first RAN;
generating the coreset from the trained partial machine learning model, wherein the trained partial machine learning model is a K-means clustering model, and generating the coreset from the trained partial machine learning model comprises generating the coreset from the trained partial machine learning model using a variation of bi-criteria K-means clustering approximation that starts with centroids of the trained partial machine learning model and their closest points.

18. A first Network Anomaly Detection, NAD, function associated with a first Radio Access Network, RAN, for predicting normal and/or abnormal User Equipment, UE, behavior in a cellular communications system, the first NAD function adapted to:
during a period of time from a time $T_0$ to a time $T_{0+T}$:
obtain information regarding a plurality of UEs served by the first RAN;
detect that a particular UE has moved from the first RAN to a second RAN; and
send at least some of the information regarding the particular UE to a second NAD function associated with the second RAN;
produce a trained partial machine learning model of UE behavior for the first RAN based on at least some of the information regarding the plurality of UEs;
send, to the second NAD function associated with the second RAN, the trained partial machine learning model of UE behavior for the first RAN or information that is representative of the trained partial machine learning model of UE behavior for the first RAN;
receive, from the second NAD function associated with the second RAN, a trained partial machine learning model of UE behavior for the second RAN or information that is representative of the trained partial machine learning model of UE behavior for the second RAN;
generate a trained global model of UE behavior based on: (a) the trained partial machine learning model of UE behavior for the first RAN or information that is representative of the trained partial machine learning model of UE behavior for the first RAN and (b) the trained partial machine learning model of UE behavior for the second RAN or information that is representative of the trained partial machine learning model of UE behavior for the second RAN; and
perform a prediction of abnormal UE behavior of a particular UE served by the first RAN based on the trained global model of UE behavior,
wherein sending, to the second NAD function associated with the second RAN, the trained partial machine learning model of UE behavior for the first RAN or information that is representative of the trained partial machine learning model of UE behavior for the first RAN comprises:
send, to the second NAD function associated with the second RAN, a coreset that is representative of the trained partial machine learning model of UE behavior for the first RAN;
generate the coreset from the trained partial machine learning model, wherein the trained partial machine learning model is a K-means clustering model, and generation of the coreset from the trained partial machine learning model comprises generate the coreset from the trained partial machine learning model using a variation of bi-criteria K-means clustering approximation that starts with centroids of the trained partial machine learning model and their closest points.

19. A first Network Anomaly Detection, NAD, function associated with a first Radio Access Network, RAN, for predicting normal and/or abnormal User Equipment, UE, behavior in a cellular communications system, the first NAD function adapted to:
during a period of time from a time $T_0$ to a time $T_{0+T}$:

obtain information regarding a plurality of UEs served by the first RAN;

receive, from a second NAD function associated with a second RAN information regarding a particular UE that moved from the second RAN to the first RAN during the period of time; and correlate the information regarding the particular UE received from the second NAD function associated with the second RAN with information regarding the particular UE obtained while the particular UE was being served by the first RAN during the period of time;

produce a trained partial machine learning model of UE behavior for the first RAN based on at least some of the information regarding the plurality of UEs and the information regarding the particular UE received from the second NAD function associated with the second RAN;

send, to the second NAD function associated with the second RAN, the trained partial machine learning model of UE behavior for the first RAN or information that is representative of the trained partial machine learning model of UE behavior for the first RAN;

receive, from the second NAD function associated with the second RAN, a trained partial machine learning model of UE behavior for the second RAN or information that is representative of the trained partial machine learning model of UE behavior for the second RAN;

generate a trained global model of UE behavior based on:
(a) the trained partial machine learning model of UE behavior for the first RAN or information that is representative of the trained partial machine learning model of UE behavior for the first RAN and (b) the trained partial machine learning model of UE behavior for the second RAN or information that is representative of the trained partial machine learning model of UE behavior for the second RAN; and perform a prediction of abnormal UE behavior of a particular UE served by the first RAN based on the trained global model of UE behavior, wherein sending, to the second NAD function associated with the second RAN, the trained partial machine learning model of UE behavior for the first RAN or information that is representative of the trained partial machine learning model of UE behavior for the first RAN comprises:

send, to the second NAD function associated with the second RAN, a coreset that is representative of the trained partial machine learning model of UE behavior for the first RAN;

generate the coreset from the trained partial machine learning model, wherein the trained partial machine learning model is a K-means clustering model, and generation of the coreset from the trained partial machine learning model comprises generate the coreset from the trained partial machine learning model using a variation of bi-criteria K-means clustering approximation that starts with centroids of the trained partial machine learning model and their closest points.

* * * * *